United States Patent [19]

Tateishi et al.

[11] 4,024,384

[45] May 17, 1977

[54] MODIFICATION IN ELECTRONIC TAXIMETER

[75] Inventors: Iwao Tateishi, Yamatokoriyama; Toshiyuki Maegawa, Higashiosaka, both of Japan

[73] Assignee: Sharp Kabushiki Kaisha, Osaka, Japan

[22] Filed: Mar. 24, 1975

[21] Appl. No.: 561,475

[30] Foreign Application Priority Data

Mar. 22, 1974 Japan .............................. 49-32987
May 17, 1974 Japan .............................. 49-55917
May 17, 1974 Japan .............................. 49-55918

[52] U.S. Cl. ..................... 235/151.32; 235/30 R; 235/45

[51] Int. Cl.² ..................................... G07B 13/10

[58] Field of Search ......... 235/151.32, 150.2, 30 R, 235/45, 92 TC, 152, 156

[56] References Cited

UNITED STATES PATENTS

| | | | |
|---|---|---|---|
| 3,388,859 | 6/1968 | Kelch et al. | 235/30 R |
| 3,698,627 | 10/1972 | Kelch et al. | 235/30 R |
| 3,736,408 | 5/1973 | Kienzle et al. | 235/30 R |
| 3,764,782 | 10/1973 | Spauszus et al. | 235/30 R X |
| 3,843,870 | 10/1974 | Craddock | 235/30 R |

*Primary Examiner*—Joseph F. Ruggiero
*Attorney, Agent, or Firm*—Birch, Stewart, Kolasch & Birch

[57] ABSTRACT

The modification is effective for use in an electronic taximeter through its ability to electrically compensate for variations in distance traveled per a predetermined number of degrees of revolutions of wheels of a vehicle in accordance with different makes and models of the vehicle. In one of the preferred forms wherein the taximeter electronics comprises means for producing only one set of electric pulses corresponding to distance traveled for the purpose of performing tariff calculations, the modification scheme provides respective one of binary-coded compensation signals dependent upon unique distance traveled per a predetermined number of degrees of the wheel revolutions of the vehicle on which the taximeter is installed, during calculation. In another form wherein the electronics comprising two sets of electric pulses corresponding to distance traveled and time of hire, although the distance pulses are subject to distance compensation, the compensation procedure is inhibited on the time pulses.

5 Claims, 7 Drawing Figures

MODIFICATION IN ELECTRONIC TAXIMETER

BACKGROUND OF THE INVENTION

The present invention relates generally to improvements in an electronic taximeter utilizing distance pulses and/or time pulses to perform tariff calculations, and more particularly pertains to new and improved taximeter which is capable of compensating for variations in distance traveled per the distance pulse due to differences in characteristics of the associated vehicle thereby performing an accurate distance measurement through the use of the thus modified or compensated distance pulses to provide tariff indication.

In the prior art taximeters, wheel revolution is evaluated through a gear system of which movement is transmitted to a shaft of which revolution in turn is introduced as input into the meter portion. In case of electronic type taximeter such revolution permits the occurrence of distance pulses.

It is well known in the field of taximeters that distance traveled per unit revolution of wheels of the associated and, in other words, distance traveled per electric pulse in case of electronic type of taximeters may vary under the influence of various factors such as the size of the wheels, the pressure of air, the gear ratio, etc., of the vehicle on which the taximeter is installed. The prior art mechanical taximeter have suggested to provide a sufficient margin of measurement to accommodate or absorb these variations in the relative distance traveled by means of an adjustable gearing. However, this requires a combination of many various kinds of gears. In addition, it is essential that the gear ratio of the respective gearing be not previously known upon installation of the taximeter on the associated vehicle. These mechanical means place limitations on the accuracy of measurement.

It is, therefore, an object of the present invention to provide a new and improved electronic taximeter which includes electric means for compensating for variations in distance traveled per each revolution of wheels of the associated vehicle due to differences in the various travel characteristics of the vehicles.

It is another object of the present invention to provide an electronic taximeter which can perform accurate measurement of a total of distance traveled, taking variations in distance traveled per each revolution of the vehicle wheels into consideration.

It is still another object of the present invention to provide electric means for compensating for the variation in distance traveled per each revolution of the vehicle wheels for use in an electronic distance and time taximeter.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings in which like reference numerals designate like parts throughout the figures thereof, and wherein:

FIG. 6($a$) is a logic diagram of a comparator circuit in the system of FIG. 4 while FIG. 6($b$) is a timing chart therefor.

DESCRIPTION OF THE PREFERRED EMBODIMENTS

Figure 1:
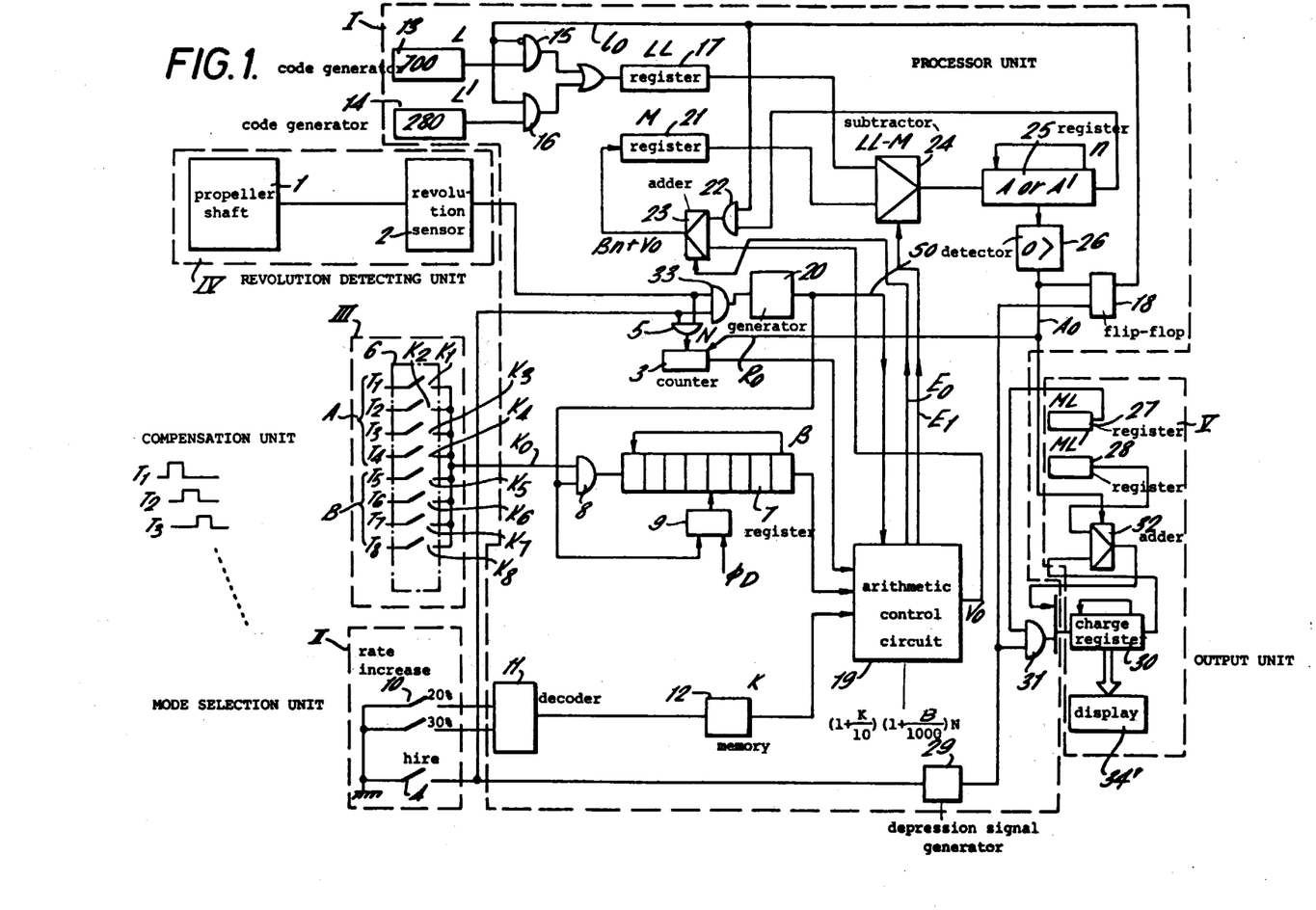
FIG. 1 is a block diagram illustration of one preferred from of an electronic taximeter embodying the present invention.

Referring now to FIG. 1, there is illustrated one preferred form of an electronic taximeter constructed in accordance with teachings of the present invention, which comprises generally a calculation unit I for performing desired arithmetic operations, a set of mode switches II for providing inputs representative of travel modes such as hire, premium fare, etc., for the calculation unit I, an input unit III consisting of a group of switches effective for electrically compensating for variations in distance traveled, a pulse generator IV for producing a set of distance pulses in response to sensing of the number of revolutions of the vehicle wheels and an output unit V for determining tariff including the initial charge and subsequent distance-dependent charge and then providing tariff indication.

Tariff calculations within present taximeters are dependent upon the general concepts that distance traveled is converted into a number of pulses indicative of revolutions of a propeller shaft and the initial charge and subsequent distance charge are computed in accordance with the number of such revolution pulses. The revolution of the shaft is such that 637 revolutions permit certain types of taxis to travel 1 Km. Nevertheless, the number of revolutions of the propeller shaft required for causing a given taxi to travel 1 Km will vary between different makes and models of taxi vehicles, for example, in the range from 640 revolutions to 680 revolutions. This requires the modification or compensation of the taximeter for each type of taxi vehicle. A set of the revolution pulses representative of distance traveled are obtainable from a magnet situated on the rotational shaft which cooperates with a lead switch mounted on the body of the vehicles.

In computing distance traveled by means of the taximeter, distance determination for the initial charge should be distinguished from that for the subsequent distance charge. For example, when it is desired to add ¥30.— to the initial charge ¥200.— for 1 Km for each excess of 300 m, no change occurs in charge for the initial distance 1 Km whereas changes occur necessarily in charge for the subsequent distance (e.g., each 300 m).

The theoretical expression which may be used to compute the initial distance and subsequent distance, within the taximeter embodying the present invention, will be described below.

A. The basic traveled distance, i.e., the traveled distance within the initial charge can be expressed by the following equation.

$$L = \left(1 + \frac{K}{10}\right)\left(1 + \frac{\beta}{1000}\right) N = A \qquad (1)$$

In other words, the basic travel distance is identified by determinations as to whether A ≦ 0. In the foregoing expression, L designates the number of pulses corresponding to the basic travel distance which is generally an unvaried value under the conventional charge system.

For example, it is assumed in the following description that the basic travel distance is 1 Km, the number of revolutions for the basic travel distance varies in the range from 640 to 680 and L is chosen as 700. Therefore, the compensation should be placed in order to accommodate these differences (640 - 680). The necessary compensation is expressed by $(1 + (K/10))(1 + (\beta/1000))$ N wherein $\beta$ is the compensation value for variations in the vehicle constant and N is the number of input pulses (revolution pulses) within the initial distance.

$\beta$ is the value necessary to compensate for the variations in the number of revolutions. It becomes possible to modify N within the scope of 10% by making $\beta$ variable from 0 through 100. Therefore, L is chosen to establish the relation $N \pm \alpha < L$ and the modification $\beta$ is provided for the number of pulses to establish the desired relation $L = (1 + (\beta/1000))$ N.

Since $\beta$ permits modification for N within the scope of 10%, the number of revolutions N can be modified up to 704 even when it has the initial value 640.

K designates increase of the rate of charge (in other words, K = 0 when hire, K = 2 when rate increase of 20% and K = 3 when rate increase of 30%). This is an additional factor but the essential features in the charge system including the increase of the rate of charge. The increase of charge occurs under special circumstances, for example, such as midnight, early morning, mountainous region, and patient transportation.

The rate increase calculation method may be implemented with either of the charge increase or the distance increase. In the latter implementation, for example, in the case of 20% increase, the number N of the input pulses during travel which reaches the number L of the pulses corresponding to the basic travel distance, is previously increased or hence by 20% so that the time for arrival at L is advanced by 20%. This provides substantially desired increase of charge rate. $(1 + (K/10))$ is the modification factor for this purpose. In the absence of increase of the rate of charge (K = 0), this item may be omitted.

B. The subsequent travel distance A', i.e., travel distance which exceeds the basic charge, can be represented by the following equation.

$$L' = \left(1 + \frac{K}{10}\right)\left(1 + \frac{\beta}{1000}\right)N'n + Bn = A' \quad (2)$$

In other words, the subsequent travel distance is identified by determinations as to whether A' < 0.

In the above representation, L' designates the number of pulses corresponding to the subsequent unit travel distance and is an unvaried value under conventional charge system. For example the subsequent travel distance may be measured with an increment of 400 m. L is chosen as 280 such that $\beta$ is made equal to that within the initial travel, because the variations due to the vehicle revolutions occur in the same way as the basic travel distance.

N' n designates the number of input pulses during the subsequent travel. The relation $(1 + (\beta/1000))$ N'n = L' is situated upon the point in time where N'n is equal to 1/2.5 N. This implies the point in time where the vehicle has traveled through 1/2.5 of 1 Km or 400 m. $(1 + (K/10))$ is useful to effect increase of the rate of charge during the subsequent travel.

When the number of the input pulses is counted as N'n during the subsequent travel, the sensing of the basic travel distance and the unit travel distance consists respectively of determinations as to whether A ≦ 0 and A' ≦ 0. Negative fractions may remain when the above requirements are satisfied. Errors will result unless the negative fraction pulses are previously added to the travel distance input pulses before a new tariff calculation. Bn designates the compensation value for this purpose.

As described above, L and L' should be chosen in line with an estimate of the variations and $\beta$ be determined in accordance with the identity of the vehicle in order to sense travel distance for accurate tariff calculation.

The operational modes of a concrete control circuit in the electronic taximeter embodying the present invention will be discussed with reference to FIG. 1.

The revolution pulses as to a revolution shaft 1 of the vehicle is sensed by a revolution sensor 2 of which the output is supplied to a counter 3 which is incremented each time the single pulse is received.

The contents of the counter 3 correspond to N, N'. The counter 3 carries out its performance in response to a hire switch 4 within the mode switches II when the taxi is operating for hire. The gate 5 is provided for such selection.

A set of switches 6 are used to determine the vehicle constant $\beta$ and have their respective input terminals coupled with timing signals $T_1$ through $T_8$. With such arrangement, $\beta$ is selectable between 0 - 99. In other words, the first block A and second block B of the switches 6 are for units in a binary progression and tens in a binary progression, respectively. For example, the keys $K_1$, $K_2$ and $K_4$ are depressed when $\beta = 13$ and the keys $K_5 K_3$, $K_4$ and $K_7$ are depressed when $\beta = 56$.

Such selection of the vehicle constant $\beta$ can be summarized in the following table.

Table I

| $\beta$ | $K_8$ | $K_7$ | $K_6$ | $K_5$ | $K_4$ | $K_3$ | $K_2$ | $K_1$ |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 1 |
| ⋮ | ⋮ | ⋮ | ⋮ | ⋮ | ⋮ | ⋮ | ⋮ | ⋮ |
| 13 | 0 | 0 | 0 | 1 | 0 | 0 | 1 | 1 |
| ⋮ | ⋮ | ⋮ | ⋮ | ⋮ | ⋮ | ⋮ | ⋮ | ⋮ |
| 56 | 0 | 1 | 0 | 1 | 0 | 1 | 1 | 0 |
| ⋮ | ⋮ | ⋮ | ⋮ | ⋮ | ⋮ | ⋮ | ⋮ | ⋮ |
| 99 | 1 | 0 | 0 | 1 | 1 | 0 | 0 | 1 |

The following is for the method for fare calculation during the initial travel and the subsequent travel.

I. Tariff calculation during the initial travel.

When the hire switch 4 is depressed, the counter 3 is incremented on receipt of the input pulse Po. Calculation as defined by the equation (1) is performed once on receipt of the single pulse Po. Since the synchronization of the pulse Po is accomplished by means of mechanical actions, calculation may be effected well before receipt of the next succeeding pulses.

Upon arrival of the pulse Po an arithmetic start signal generator 20 produces an arithmetic start signal So which in turn transfers the contents of the switches 6 into a memory register 7. An arithmetic control circuit 19 is responsive to β stored in the register 7, K stored in a memory 12 and N stored in the counter 3 to perform the calculation $(1 + (K/10)) (1 + (β/1000)) N$. The arithmetic result is introduced as the output Vo to a register 21 in synchronization with an arithmetic complete signal Eo. Because of a flip-flop 18 in its reset condition due to a depression pulse from a depression generator 29, a gate 22 is OFF such that the register 21 is loaded with the output Vo through an adder 23 which may be used during the subsequent travel as described later on. Upon the occurrence of an arithemtic pulse $E_1$ following the signal Eo, a subtractor 24 performs its performance on the contents of the registers 17 and 21, the resultant answer being supplied to a register 25.

In other words, the contents of the register 25 correspond to A in the equation (1). A detector 26 determines whether the contents of A is smaller than 0 and, if no affirmative answer is obtained, provides no output. This completes the arithmetic sequence. In other words, this suggests that the basic travel distance has been reached.

The events throughout the arithmetic sequence as discussed above are repeated each time the revolution pulse Po occurs and, therefore, the arithmetic control circuit 19 performs the calculation $(1 + (K/10)) (1 + (β/1000)) N$ with incrementing the value of N.

The timing signals are applied to the input terminals of the keys K1 ... K8 in order to convert the numerical value created by the operations of the switches 6 into the associated binary codes. As an example, when the keys $K_1$, $K_2$ and $K_5$ are depressed, the output Ko of the keys is $T_1 + T_2 + T_5$ and thus produces 11001000 in time sequence. This corresponds to the combination of binary codes for 13.

In the illustrated embodiment, the binary code signals are stored in the buffer register 7. The loading of the register 7 is carried out upon clocks $φ_D$ synchronous with the timing signals $T_1 - T_8$. In order that the register 7 output at a rate synchronous with that of the arithmetic unit, the binary coded signals (Ko and hence β) are inputted to the register 7 immediately before initiating the calculation. The gate 8 permits the introduction of the signal β responsive to the arithmetic start signal. Another gate 9 determines conditions as to clock pulses for permitting the output Ko to enter into the register 7. 10 is a charge rate increase switch which causes a decoder 11 to produce a corresponding numeral code which is then stored in the memory 12. The numeral codes are 0010 for a 20% increase and 0011 for a 30% increase, respectively. The value stored in the memory 12 corresponds to K.

A pair of binary code generators 13 and 14 produce, respectively, binary code signals representative of the values L and L', the former being stored in the memory 17 through the gate 15 during the initial travel condition and the latter being stored in the same memory 17 through the gate 16 during the subsequent travel condition.

$e_o$ is a distinction signal between the initial travel condition and the subsequent travel and may be obtained from a flip flop 18 which is set upon the output from a detector 26 and reset upon the counterpart from the depression pulse generator 29.

The arithmetic control part 19 is a circuit which accomplishes the calculation $(1 + (K/10)) (1 + (β/1000)) N$. Such calculation may be accomplished by utilization of the respective values of K, β and N through the well known technique. $A ≤ 0$ at the arrival of any Po and, in these circumstances, the detector 26 produces its output indicating that the basic distance has been traveled.

Within the unit V, the memory 27 is a register storing the basic charge, for example, binary code signals representative of ¥200.- per 1 Km. If the distance traveled is within the scope of 1 Km and the charge is ¥200.-, then the contents of the register 27 will be previously transferred to a charge register 30 in response to the depression pulse from the generator 29. The gate 31 is active at this time.

When $A ≤ 0$ is evaluated by 26 and the output signal Ao permits the subsequent tariff calculation, e.g., addition of ¥50.- for 400 m, the adder 32 performs addition on the contents of the memory 28 and the charge register 30. In other words, if 1 Km is exceeded, the charge is visually indicated as ¥200 + ¥50 = ¥250.

The occurrence of the output of the detector 26 upon $A = 0$ causes the flip flop 18 to turn to its set condition and, thereafter, the procedure is advanced to the subsequent charge calculation process as defined by the equation (2) upon the next revolution pulses Po.

II. Tariff calculation during the subsequent travel

After the passing of the basic travel distance (i.e., $A ≤ 0$), the detector 26 produces the output Ao which causes N contained in the counter 3 to be reset or cleared. Upon the arrival of the next succeeding pulses Po, the arithmetic control 19 operates as the same manner as set forth in the paragraph (I) to produce the output Vo. Because of the flip flop 18 in its set condition the gate 22 is opened so that the output Vo is added to the contents of the register 25 by virtue of the adder 23 and the addition result is transferred to the register 21. As noted earlier, the contents of the register 25 when $A' < 0$ is sensed corresponds to Bn in the equation (2) and accordingly the register 21 is loaded with $(1 + (K/10)) (1 + (β/1000)) Wn + Bn$. The succeeding subtraction on the contents of the registers 17 and 21 (or LL - M) is accomplished by the subtractor 24, the resultant answer being inputted to the register 25. The value contained within the register 25 corresponds to A'.

Under these circumstances the contents of the register 14 storing the subsequent pulses L' are substituted for that of the register 17 due to the gate 16 opened by the flip flop 18 in its set condition. After the subtraction (LL - M) between the registers 17 and 21, the contents of the register 25 corresponds to A'. The detector 26 determines whether A' (within the register) $≤ 0$.

If A' is greater than 0, the above operational sequence is repeated for every recei receipt of Po.

The occurrence of the output of the detector 26, i.e., $A' = 0$ shows that 400 m has further been traveled and charge addition becomes necessary.

The adder 32 is effective to add the contents (ML) of the register 28 to the charge register 30 upon the appearance of the output Ao from the detector. The charge register 30 which stores as the previous contents the basic charge or fare ¥250.-, is incemented up to ¥300.- due to addition of ¥50.

When the passenger has left the vehicle and the driver turns the line switch 4 off, the gate 33 in its closed condition produces no start signal So to inhibit further calculation. The contents of the register 30 may be either cleared when the swithc 4 is off or pushed away when the basic charge is again inputted through the gate 31.

Employment of the compensation value $(1 + (\beta/1000))$ as defined by the equations (1) and (2) for compensating for variations in the number of the revolution pulses permits the count of the counter to conform successfully to the total of distance traveled.

A total travel distance counter and its modes of the operation will be described below with reference to FIGS. 2 and 3.

Figure 2:
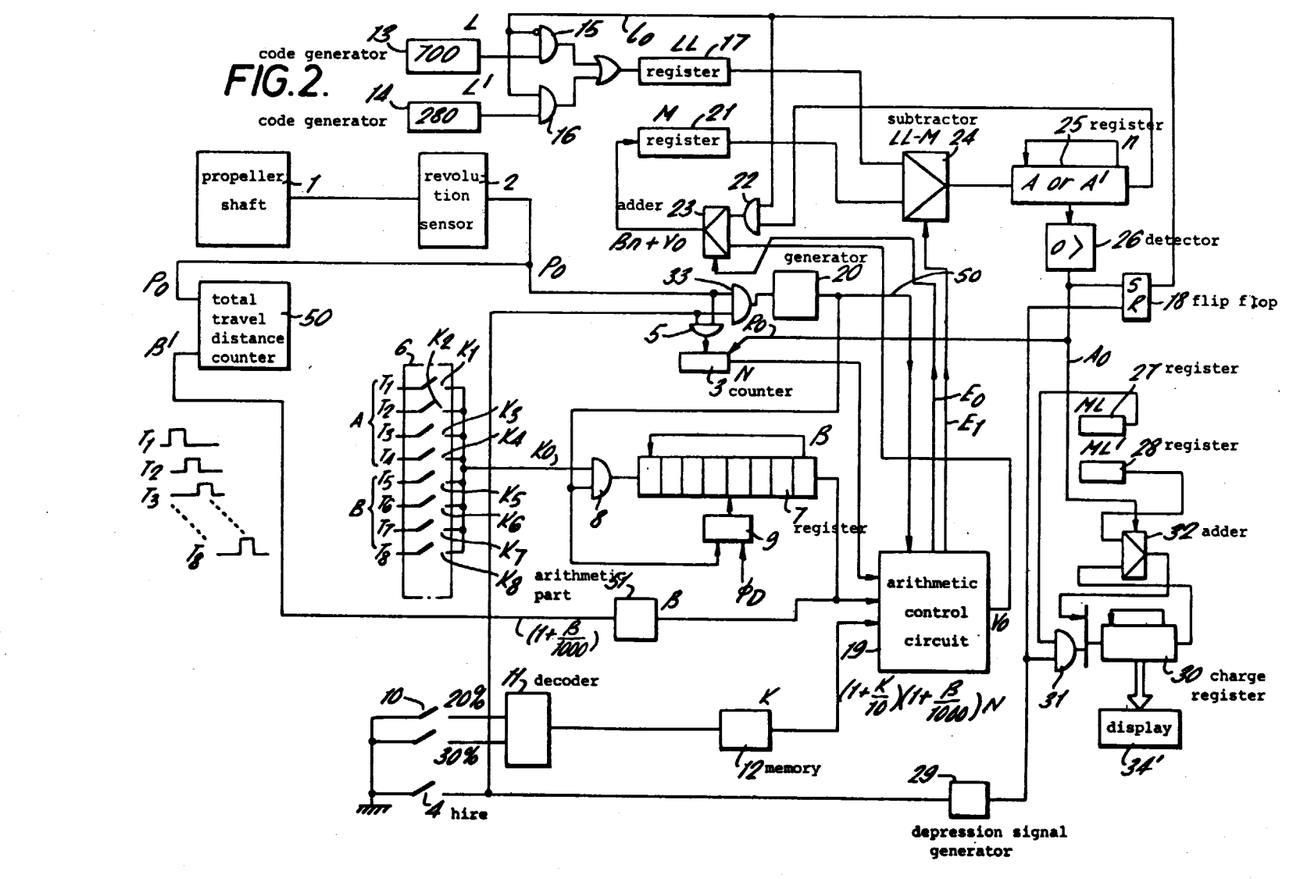
FIG. 2 is a schematic diagram illustration of an total distance measurement section useful with the system of FIG. 1.

As illustrated in FIG. 2, a total travel distance counter 50 receives both of the revolutions pulses Po and the compensation item $(1 + (\beta 1000)) = \beta'$. An arithmetic part 51 of FIG. 2 establishes the value $\beta'$ in accordance with $\beta$ contained within the register 7. Calculation within the total distance counter 50 will be given by the following formula.

$$J - \left(1 + \frac{\beta}{1000}\right) \rightarrow J \qquad (3)$$

The symbol J designates the number of the revolution pulses per unit distance traveled in the total distance counter scheme. The typical number of the revolution pulses is 70 per 100 m in the case where 700 pulses are produced per 1 Km.

Upon the arrival of the revolution pulses Po created by vehicle travel, this is converted via a converter 35 into an arithmetic synchronizing signal which then is provided via a line 41 as subtraction command for a gate 36 and an adder/subtractor 39. The second input to the gate 36 is the compensation item $\beta' = (1 + (\beta/1000))$. The subtraction of $\beta'$ is effected on the register 37 storing J each time the revolution pulse Po is received. The result is again loaded into the register 37 via the line 47.

Pursuant to the calculation procedure as defined by the formula (3), $J < \beta'$ upon receipt of the pulse Po and the resultant borrow signal on a line 49 sets the flip flop 38. This opens a gate 40 so that the adder/subtractor 39 performs addition of the count (the numeral codes for 70 in the given example) of the register 34 and the count of the register 37.

$$J + 70 \rightarrow J \qquad (4)$$

This corresponds to addition of the remainders. The occurrence of the borrow signal also permits increment of the counter 43. Upon the receipt of the revolution pulses Po following the occurrence of the borrow signal, the adder/subtractor 39 performs the subtraction of $\beta'$ from the contents of the register 37 as defined by the formula (3), and then the occurrence of the next borrow signal due to $J < \beta'$ permits the addition defined by the equation (4) and the increment of the counter 43. The operational sequence is repeated each time the revolution pulse $P_o$ is received. The contents of the counter 43 are visually indicated by energization of an indicator 45 through a decoder/driver 44. The contents of the indication will vary per 100 m. In FIG. 3 46 is an electromagnetic counter which directly receives the borrow signal.

Figure 3:
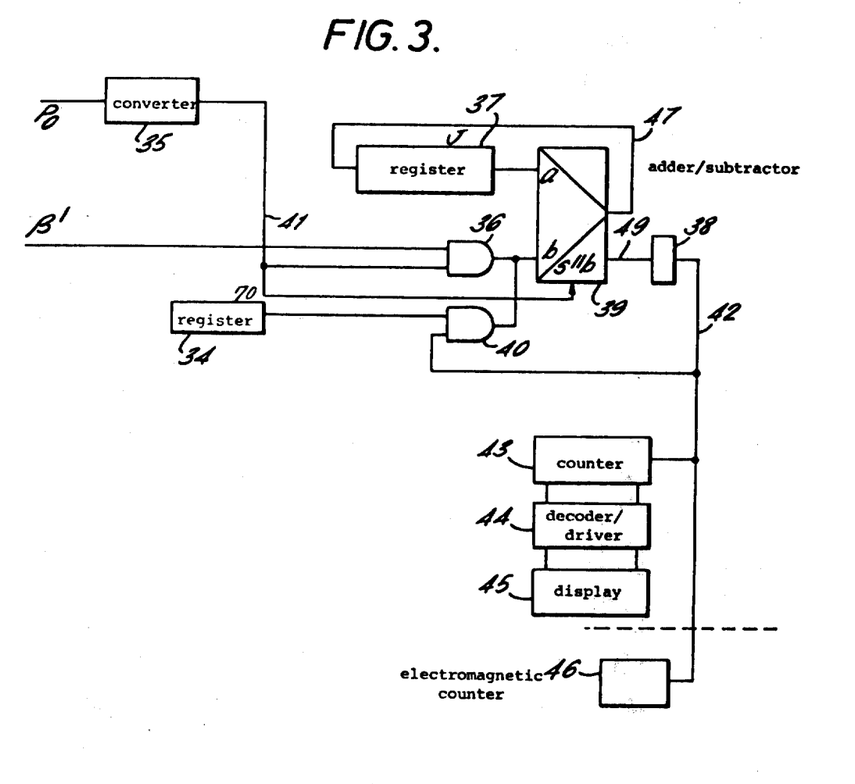
FIG. 3 is a logic diagram of the total distance measurement section of FIG. 2.

With such an arrangement illustrated in FIGS. 2 and 3, the remaining revolution pulses per unit distance travel is incorporated into the next distance calculation procedure thereby to reduce or eliminate any measurement error.

The concept of the present invention is applicable to another type of the electronic taximater wherein tariff calculation is dependent upon the number of revolutions corresponding to distance traveled when the vehicle is running above a predetermined speed and upon time when the vehicle is running below the predetermined speed or stopping. Time has the priority over distance when the vehicle is running below the predetermined speed or stopping and becomes the only effective factor during tariff calculation.

Figure 4:
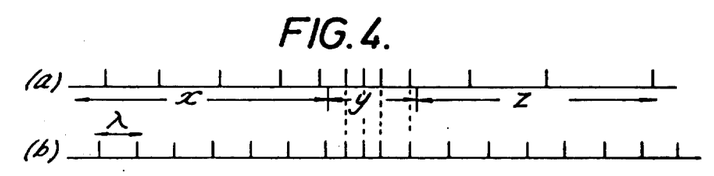
FIG. 4 is a block diagram illustration of another preferred form of an electronic taximeter embodying the present invention.

With reference to FIG. 4($a$), it will be assumed that the revolution pulses are created in response to the revolution of the shaft. The speed is extremely low in the first region x and accordingly an effective equivalent pulse is created as illustrated in FIG. 4($b$) each time a predetermined period $\lambda$ is exceeded in this region x where time is the only effective factor during tariff calculation. The effective equivalent pulse is the counterpart to the revolution pulse Po with only exception that the effective equivalent pulse is created based upon both of distance traveled and time. In the second region y the revolution pulse discussed above is introduced as the effective equivalent pulse and in the third region z the single effective equivalent pulse is created each time $\lambda$ is exceeded.

$\lambda$ is fixed by determining the predetermined speed and L in the equation (1), for example, 257 m seconds under the assumption that the predetermined speed is 20 Km/h and L = 700.

It will be understood that tariff calculation in the electronic distance/time taximeter is accomplished by processing the effective equivalent pulses just described as N and Nn' defined in the equations (1) and (2).

Figure 5:
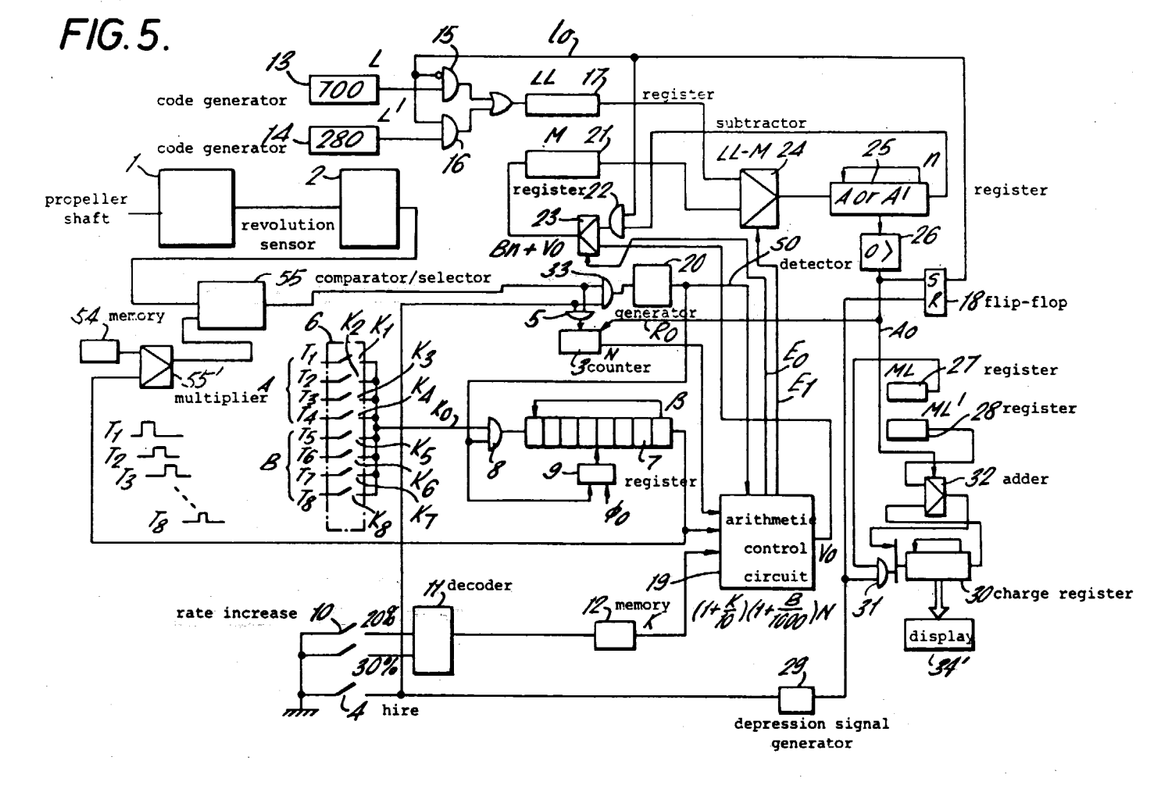
FIG. 5 is a timing diagram illustrating the occurrence of reference distance pulses utilized by the system of FIG. 4.

FIG. 5 illustrates another embodiment embodying the present invention wherein two factors, distance and time are employed to perform tariff calculation.

Figure 6:
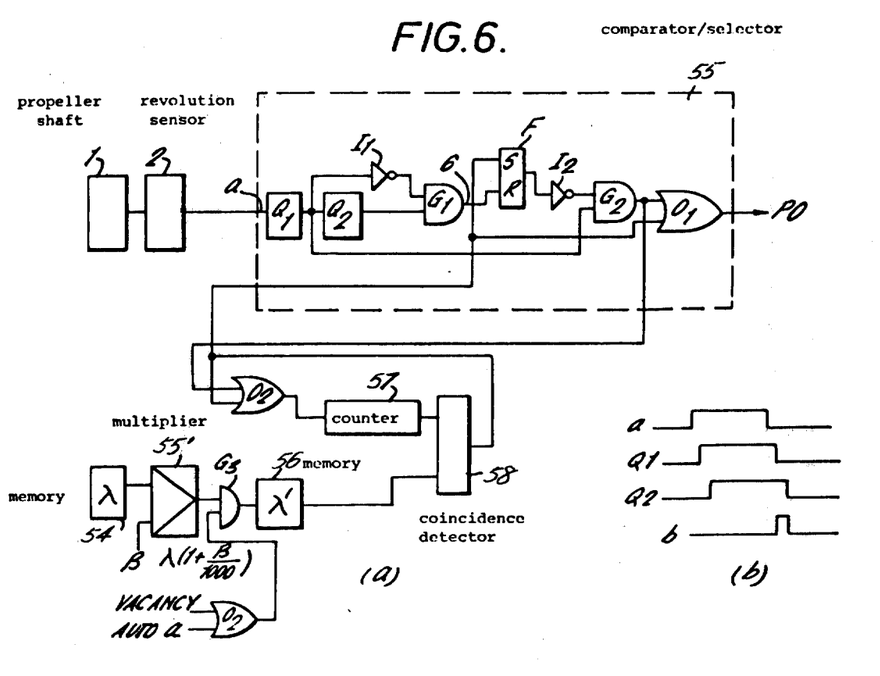

As described previously, the revolution pulses as to the propeller shaft 1 are obtainable from the revolution sensor 2. The value of $\lambda$ is previously contained within a memory 54. The equivalent pulses are derived from selection of either one of the revolution pulse and time pulse associated with $\lambda$ after comparison in period therebetween. Such comparison can be accomplished by a period comparator/selector 55 of FIG. 5. FIG. 6 illustrates such comparison in greater detail.

A multiplier 55' performs the operation $\lambda (1 + (\beta/1000))$ based upon $\lambda$ stored in a memory 54 and $\beta$ and then a memory 56 stores $\lambda' = \lambda (1 + (\beta/1000))$. This permits the compensation item $(1 + (\beta/1000))$ as defined by the equations (1) and (2) to be incorporated into a circuit arrangement for example the arithmetic control 19 of FIG. 5, the compensation item being necessary only when the vehicle is running above the predetermined speed. Therefore, the compensation item should be eliminated for the time pulse. Since the embodiment of FIG. 5 is a adapted to employ the effective equivalent pulse Po for the compensation item, the compensation for the time pulse should be canceled by previously inserting the compensation item thereto. The processing of the multiplier 55' is dedicated for this purpose. A coincidence detector 58 produces the time pulse when there is an equivalency between the count of a counter 57 incremented by the output of a crystal oscillator and $\lambda'$ stored in the memory 56. At this time the counter 57 is reset by such time pulse through an OR gate $O_2$ and restarts to increment.

The revolution pulses from the revolution sensor 2 are applied to D type flip flops $Q_1$ and $Q_2$ to develop the pulse $d$ as illustrated in FIG. 6($b$) through an inverter $I_1$ and an AND gate $G_1$. The pulse $b$ is a signal which resets an R-S type flip flop F and is created each time the revolution pulse is produced. The resetting of the flip flop F is due to the following reason. If the time pulse created upon the equivalency between the count of the counter 57 and $\lambda'$ stored in the memory 56 sets the flip flop F, the setting of the flip flop F will render an AND gate $G_2$ closed through an inverter $I_2$ such that the revolution pulse is blocked to output through the OR gate $O_1$. The resetting of the flip flop F serves to clear the blocked or locked condition.

Therefore, the revolution pulse will be outputted through the OR gate $O_1$ if the next succeeding revolution pulse is produced before the occurrence of the time pulse. This revolution pulse forces the counter 57 to be reset or cleared.

However, in the case where the vehicle is traveling below the predetermined speed the flip flop F in again set upon the occurrence of the time pulse to block the next succeeding pulses, the time pulse instead being outputted through the OR gate $O_1$.

In this manner, the output Po from the comparator/selector 55 is introduced as the effective equivalent pulse into the tariff calculation system.

Reverting to FIG. 5, the equivalent pulse Po is impressed on the AND gates 5 and 33 and the counter 3 is incremented upon receipt of the equivalent pulse Po through the hire switch 4 in its on condition. The count of the counter 3 corresponds to N and Nn' in the equations (1) and (2). The opening of the AND gate 33 following the closing of the hire switch 4 permits the generator 20 to produce the arithmetic start signal $S_a$ in response to the arrival of the equivalent pulse Po. Under these circumstances, the arithmetic control 19 aids in performing the operation $(1 + (K/10)) (1 + (\beta/1000)) N$ with an increment of N by utilization of the equivalent pulse Po in the case where it is desired to determine tariff due to the two factors.

While only certain embodiments of the present invention have been described, it will be apparent to those skilled in the art that various changes and modifications may be made therein without departing from the spirit and scope of the invention as claimed.

What is claimed is:

1. An electronic taximeter adaptable to a variety of different makes and models of vehicles exhibiting a like variety of scaling factors correlating actual distance travelled to a selected standard, comprising:
    distance pulse generating means for creating a plurality of distance pulses of which a given number of pulses is representative of a selected standard distance traveled by an associated vehicle;
    key switch input means selectively actuated to provide a compensation code signal representative of a said known scaling factor for a given associated vehicle correlating distance travelled by the latter with said selected standard distance; and
    means responsive to said distance pulses and said compensation code signal selected by said key switch input means for compensating for said scaling factor and determining the actual distance travelled by the said given associated vehicle.
2. An electronic taximeter as defined in claim 1, wherein the respective compensation codes consist of a plurality of numerical codes; and
    wherein said key switch input means includes a set of key-code switches selectively actuated in combinations definitive of said numerical compensation codes.
3. The invention defined in claim 2, wherein said key-code switches include a plurality of individual input terminals and a common output terminal;
    wherein said taximeter further includes timing pulse generating means providing a like plurality of timing pulses; and
    wherein respective ones of said input terminals of said key-code switches are driven by respective ones of said timing pulses.
4. An electronic taximeter as defined to claim 1 further including a comparator comparing the number of the distance pulses generated with a given reference number representing said selected standard distance, the number of the distance pulses exceeding the reference number being then utilized during the next succeeding comparison procedure thereby to attain measurement for a total of distance traveled.
5. An electronic taximeter as defined in claim 1, wherein the number of said distance pulses is a function of not only distance traveled but also time during which a said associated vehicle travels below a predetermined speed.

* * * * *